United States Patent
Parlante

[11] Patent Number: 5,949,232
[45] Date of Patent: Sep. 7, 1999

[54] METHOD FOR MEASURING THE ENERGY CONSUMPTION OF INDIVIDUAL UNITS IN A MULTIPLE UNIT FACILITY OPERATED FROM A SINGLE FURNACE

[76] Inventor: Nicholas Parlante, 36 Broadway, Dobbs Ferry, N.Y. 10522

[21] Appl. No.: 08/892,608

[22] Filed: Jul. 14, 1997

[51] Int. Cl.[6] .................................................. G01R 7/00
[52] U.S. Cl. ........................ 324/142; 324/103 R; 324/140
[58] Field of Search .............................. 324/142, 103 R, 324/140; 702/62; 705/412

[56] References Cited

U.S. PATENT DOCUMENTS

| | | | |
|---|---|---|---|
| 3,681,681 | 8/1972 | Auslander | 324/72.5 |
| 3,970,929 | 7/1976 | Borucki et al. | 324/417 |
| 4,002,890 | 1/1977 | Wellin | 705/412 |
| 4,449,187 | 5/1984 | Scott | 705/412 |
| 4,558,958 | 12/1985 | Peña et al. | 374/39 |
| 4,591,988 | 5/1986 | Klima et al. | 705/412 |
| 4,814,996 | 3/1989 | Wang | 324/142 |
| 4,901,007 | 2/1990 | Sworm | 324/110 |
| 4,924,404 | 5/1990 | Reinke, Jr. | 705/412 |
| 5,089,771 | 2/1992 | Tanguay et al. | 324/142 |
| 5,315,236 | 5/1994 | Lee | 324/157 |
| 5,646,858 | 7/1997 | Schrock et al. | 705/412 |

*Primary Examiner*—Josie Ballato
*Assistant Examiner*—Jermele M. Hollington
*Attorney, Agent, or Firm*—Eugene Lieberstein; Michael N. Meller

[57] ABSTRACT

A method for computing the energy consumed by each unit in a multiple unit facility operating from a single furnace which burns fossil fuel. The method involves connecting an hour meter in a separate electrical circuit including a hot water circulator or a blower fan in series with a thermostat and a source of line voltage and using a microprocessor to allocate the proportional use of energy by each of the units relative to the total usage of all of the units by comparison of the reading of each hour meter in each unit to the combined reading of all of hour meters and computing in dollars the energy consumption of each unit during said time period by multiplying the allocated proportion by a number corresponding to the fuel cost over said time period.

2 Claims, 2 Drawing Sheets

METHOD FOR MEASURING THE ENERGY CONSUMPTION OF INDIVIDUAL UNITS IN A MULTIPLE UNIT FACILITY OPERATED FROM A SINGLE FURNACE

BACKGROUND OF THE INVENTION

The present invention relates to a method of measuring the proportional consumption of energy usage in each unit of a relatively small multiple unit facility e.g. a multiple unit apartment dwelling or commercial building relative to all of the other units when operated from a single fossil fuel burning furnace.

In recent times, considerable emphasis has been placed on energy conservation as the result of rising energy costs and the depletion of fossil fuel supplies. Most of the energy conservation efforts have been made in industry as a result of governmental regulation in contrast to energy conservation based upon financial savings particularly from the individual consumer. In smaller size multiple dwellings operated from a single furnace which burns fossil fuel there is little, if any, motivation on the part of the consumer renting a given unit to limit fuel consumption since individual unit consumption of fuel is hard to measure. As a result the owner of the multiple dwelling includes the cost of energy consumption in the rental charge for the unit. It is not cost effective for an owner of a small building to install additional furnaces so that each unit will operate from its own furnace.

Watt hour meters are conventional and well known for measuring energy consumption from a source of electricity either to an individual house or building or to an individual appliance and from which the cost of electricity may readily be derived, see for example U.S. Pat. Nos. 4,814,996, 4,901,007, 5,089,771 and 5,315,236 relative to its use of a watt hour meter in connection with an appliance. However in connection with a small multiple dwelling which utilizes a single fossil fuel furnace to supply heat or air conditioning to each of its multiple units it is not known to date how to apportion or allocate cost attributable to energy consumption from each of the individual units. The reason for this is that there is, at present, no method to directly correlate the fossil fuel being consumed by the single furnace for which the owner of the facility is responsible and the energy consumption in each of the individual units for which the lessees are responsible over any given time period.

The present invention relates specifically to a relatively small multiple dwelling or building which employs a single furnace which consumes fossil fuel e.g., oil, wood or gas. The furnace will supply heat or air conditioning to each of the units either by the circulation of hot water through a radiator in each unit or by circulating hot air to each of the units using a separate blower for each unit. The hot water circulator in a "hot water system" or the blower for each unit in a "hot air system" are individually connected to a source of electricity through a relay switch of a thermostat located in each unit which is under the control of the unit renter. The method of the present invention utilizes an hour meter to determine the energy consumed in each of the units in proportion to the energy consumed in all of the other units of a multiple dwelling operated from a common furnace which consumes fossil fuel.

SUMMARY OF THE INVENTION

The present invention relates to a method for measuring the proportional consumption of energy in each unit of a multiple unit facility operating from a single fossil fuel furnace relative to the total consumption of energy used in all of the units of the facility over a given time period wherein the facility is characterized by having either a hot water system or a hot air system for providing heat or air conditioning to each of the respective units in the facility with each unit having a hot water circulator or a blower fan respectively based upon the type of system used in the facility comprising the steps of: connecting an hour meter in electrical circuit with either the hot water circulator or with the blower fan in each unit of said multiple unit facility, measuring the operating usage in time for the hot water circulator or blower fan for each unit over a given time period, comparing the relative usage of the hot water heater or blower fan in each unit against the total usage for all the units to obtain a percentage of relative usage for each unit and apportioning the energy consumption of said furnace in said facility to each unit based upon said percentage calculation.

BRIEF DESCRIPTION OF THE DRAWING

The advantages of the present invention will become apparent upon reading the following detailed description of the invention in conjunction with the accompanying figures of which.

BRIEF DESCRIPTION OF THE PREFERRED EMBODIMENT

Figure 1:
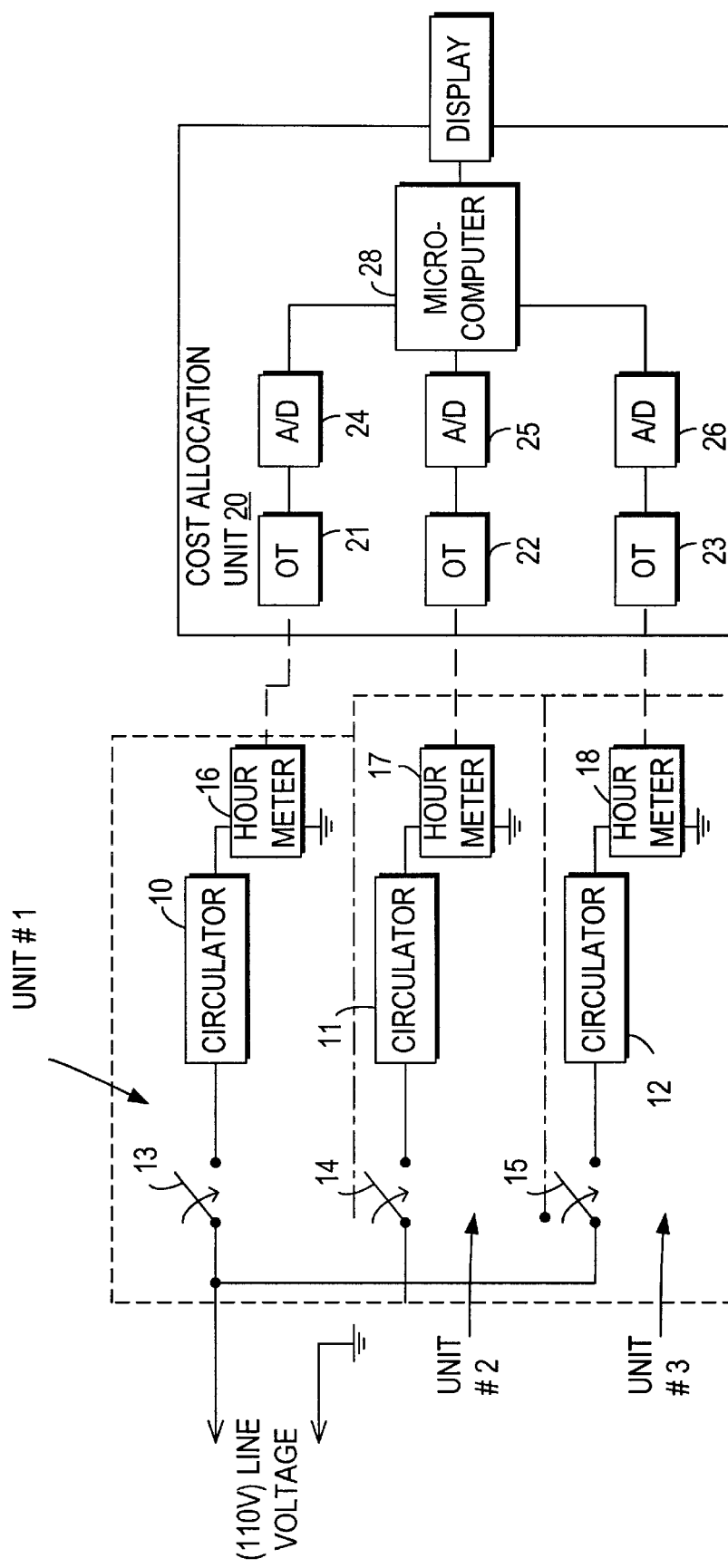
FIG. 1 is a schematic diagram of the preferred embodiment of the present invention.

This invention accomplishes the task of assessing energy consumption for each unit in a multiple unit facility operating from a single furnace which consumes fossil fuel, such as oil, wood or gas. The assessment is preferably made relative to the total consumption of all of the units in the facility. FIG. 1 is a simplified schematic representation of a 3 unit facility with each unit having either a circulator for circulating hot water through a radiator in each unit or a blower fan for supplying hot air through the ducts connecting the furnace to each unit respectively. The facility may obviously have any number of units although as a practical matter only a limited number of units may be operated efficiently from one common furnace. The circulators 10, 11 and 12 for the units numbered #1, #2 and #3 are each connected to a common source of line voltage through a relay switch 13, 14 and 15 respectively. The relay switches 13, 14 and 15 are actuated by a thermostat (not shown) under the control of the operator in each of the units #1, #2 and #3 so that each unit will be supplied heat independent of the other units. When the lessee of unit #1 sets the thermostat in unit #1 to actuate circulator 10 this causes hot water to be circulated through the radiator(s) in unit #1 at a water temperature controlled by the furnace. The furnace operates independent of the circulator control for regulating the hot water or hot air temperature and its operation in this regard is not relevant to the subject invention. The circulator 10 will continue to operate until the thermostat in unit #1 reaches the selected thermostat setting. In accordance with the present invention an hour meter 16, 17 and 18 is connected in the electrical circuit of each circulator 10, 11 and 12 respectively to cumulatively measure the hourly usage of each circulator. The hour meters 16, 17 and 18 are conventional devices which operate electromagnetically or digitally and will measure the elapsed operating time for each circulator 10, 11 and 12 in each of the units #1, #2 and #3 of the facility. The hour meters 16, 17 and 18 may also include a visual display to display the elapsed time as a numerical value. This numerical value will identify the cumulative usage in time of each respective circulator. Actual usage is determined by simple substraction of the numerical value at the end of a given time period from the numerical value at the commencement of such time period.

Each of the hour meters 16, 17 and 18 may be manually read or connected to a cost allocation unit 20 as shown in FIG. 1 unit to provide a direct cost allocation attributable to each unit in the facility. The cost allocation unit 20 comprises an optical or electrical transducer 21, 22 and 23 for each hour meter 16, 17 and 18 respectively and an analog to digital converter 24, 25 and 26. The output of each analog to digital converter 24, 25 and 26 is applied to a microcomputer 28 which is programmed to proportion the usage of each unit based upon the reading from the hour meter relative to the total usage over a given time period and, if desired, to calculate the energy cost for each unit for such time period based upon a preselected rate. The microcomputer 28 also has a memory to retain the values from one time period to the next. The cost can also be displayed in a display (not shown).

Figure 2:
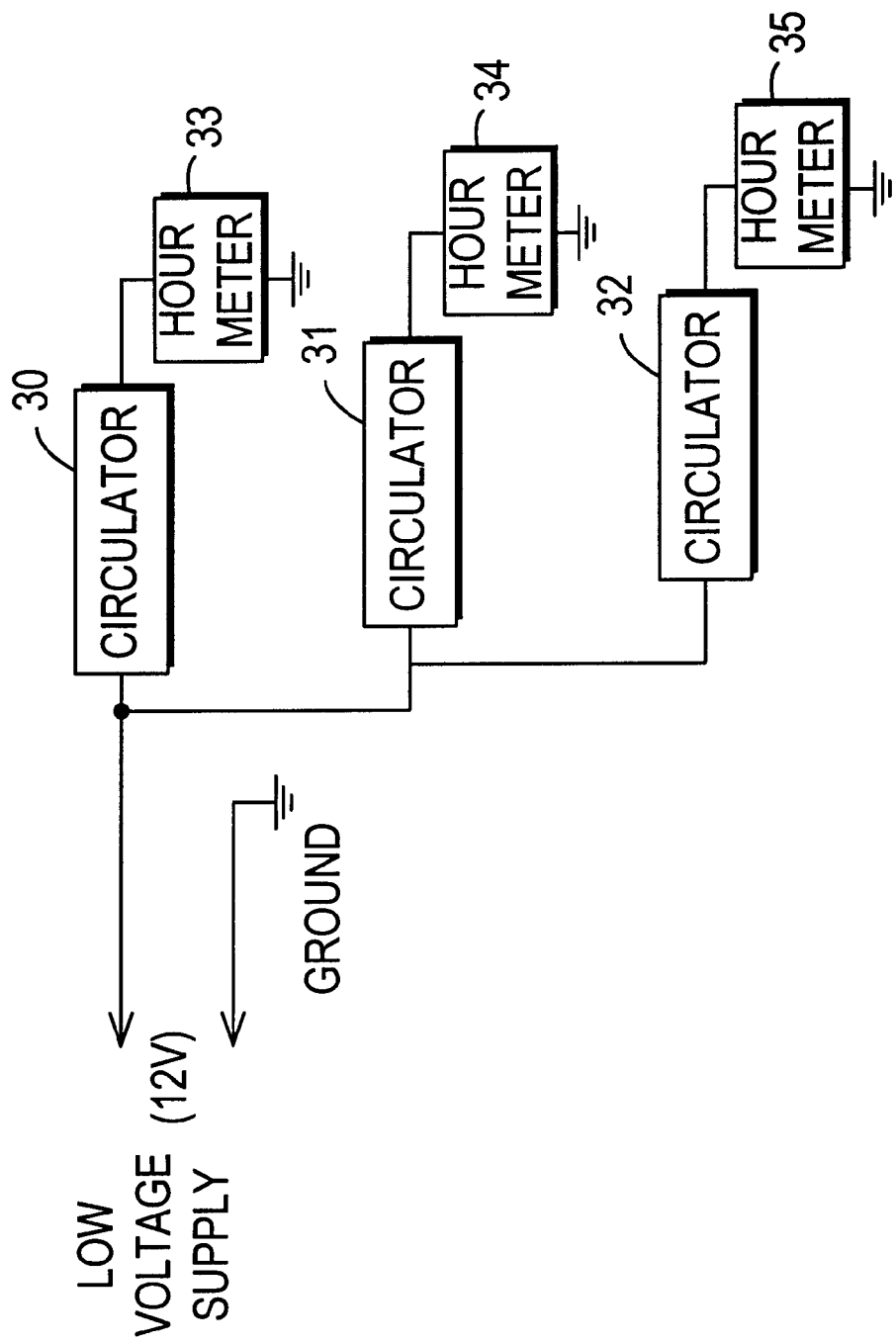
FIG. 2 is a schematic diagram of an optional additional feature of the present invention.

An additional embodiment of the present invention is illustrated in the circuit schematic diagram of FIG. 2 which shows a thermostat 30, 31 and 32 for each of the units #1, #2 and #3 in the facility with each thermostat 30, 31 and 32 connected to a conventional 12 volt line supply. In each such circuit an hour meter 33, 34 and 35 is connected with the hour meter configured to operate from a 12 volt supply so as to identify the cumulative operating time of each thermostat in each given unit. When the thermostat is manually set at a level above or below the operating temperature of the surrounding environment the circuit in which the thermostat is included is electrically completed thought the thermostat as is well known to those skilled in the art. The thermostat operates in a conventional manner and simulates a switch which is closed when the temperature of the environment is not at or above (for heat) the thermostat setting. The hour meter will recognize the completion of the circuit and identify the cumulative period of time the thermostat is closed i.e. "on". This can be used as a verification for the lessee of the unit of the cost allocation attributable to that unit when provided with a billing rate which can be compared against the total energy consumption for the facility.

I claim:

1. A method of measuring the energy consumed in each unit of a multiple unit facility, operating from a single furnace which consumes fossil fuel, relative to the energy consumed by all of the units in the facility over a given time period wherein the facility is characterized by having either a hot water system or a hot air system for providing heat and/or air conditioning to each of the respective units in the facility with each unit having a corresponding hot water circulator or a blower fan connected in an electrical circuit in series with a thermostat and a source of line voltage respectively, comprising the steps of: connecting an hour meter in each electrical circuit of each unit in said multiple unit facility, taking a reading from each hour meter in each unit at the start and end of said given time period with each reading corresponding to the time the respective hour meter is activated in the electrical circuit throughout said time period, storing the reading from each said hour meter in a microprocessor, combining the reading taken from each said hour meter to compute a total reading corresponding to the combined activation time of all of the hour meters, using the microprocessor to allocate the proportional use of energy in each of the units relative to their combined usage by comparison of the reading of each said hour meter to the total reading and multiplying the allocated proportion by a number corresponding to the cost of fuel burned in said furnace over said time period to compute in dollars the energy consumption of each unit during said time period.

2. The method of claim 1, whereby the furnace is fueled by wood, gas or oil.

\* \* \* \* \*